No. 609,319. Patented Aug. 16, 1898.
C. T. ADAMS.
VEHICLE TIRE.
(Application filed June 16, 1897. Renewed July 21, 1898.)

(No Model.)

WITNESSES:
Chas. L. Litch
Chester Higgins

Calvin Thayer Adams
INVENTOR
BY Clarence L. Bryan
ATTORNEY.

UNITED STATES PATENT OFFICE.

CALVIN THAYER ADAMS, OF NEW YORK, N. Y.

VEHICLE-TIRE.

SPECIFICATION forming part of Letters Patent No. 609,319, dated August 16, 1898.

Application filed June 16, 1897. Renewed July 21, 1898. Serial No. 686,582. (No model.)

*To all whom it may concern:*

Be it known that I, CALVIN THAYER ADAMS, a citizen of the United States, residing in the city, county, and State of New York, have invented a new and useful Improvement in Vehicle-Tires; and I do hereby declare that the following is a full, clear, and exact description of the same.

My invention relates to means for preventing the pneumatic or cushioned tires of bicycles and other wheeled vehicles from slipping on the roadway, as they are particularly apt to do when the roadway is smooth and wet.

In another application for patent executed by me January 14, 1897, and filed in the Patent Office I have illustrated a tire for this purpose having its bearing-surface studded with headed rivets driven through the material of the tread, so that their outer ends will be exposed on the bearing-surface of the tread to engage the roadway and prevent slipping, and yet leave the elastic material of the tread fully presented between the rivets, so as to make its necessary adhesive and elastic contact with the roadway.

My present invention consists, mainly, of a tire or tread of fabric having the rivets or other hard road-engaging parts woven in the meshes of the fabric so as to be properly exposed on the outside of the tread. Such a tread can be easily and cheaply manufactured, and is very durable, as well as effective.

In order that my invention may be fully ascertained, I shall first describe in detail the mode in which the invention is carried into practice and then define the invention in the claim.

Reference is to be had to the accompanying drawings, forming part of this specification, in which the same parts are designated by like letters in all the figures.

Figure 1:
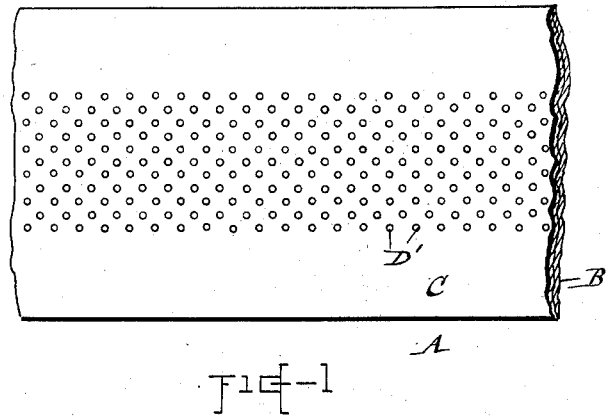
Figures 2, 4:
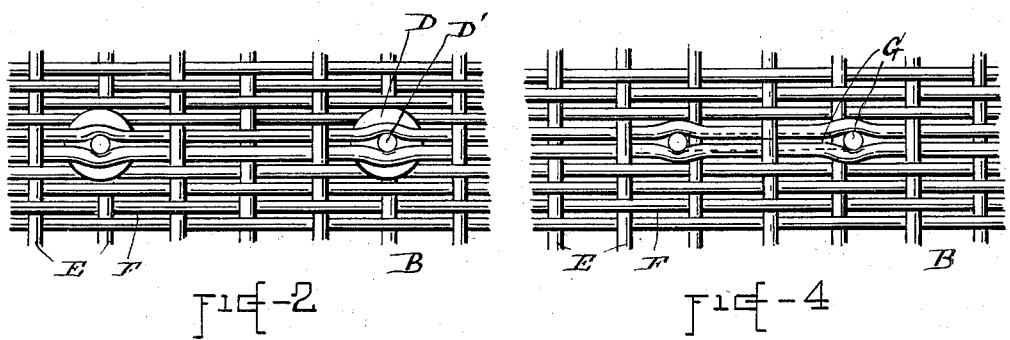
Figures 3, 5:
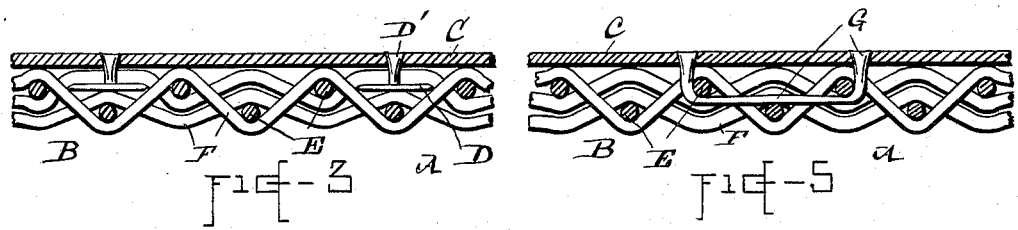
Figure 6:

Figure 1 represents a portion of a tire-tread embodying my invention. Fig. 2 is a magnified view of the tread with the rubber covering removed, showing headed rivets woven in the meshes of the tread fabric in accordance with my invention. Fig. 3 is a magnified sectional view of the same with ordinary rubber covering applied. Fig. 4 is a magnified view of a fabric tread with the rubber covering removed, showing staples woven in the meshes of the fabric in accordance with my invention. Fig. 5 is a magnified sectional view of the same with the rubber covering applied. Fig. 6 shows a modification.

The tire-tread A (represented in Figs. 1 to 5 to illustrate the practice of my invention) is made of two-ply woven fabric B, covered with an outside layer C of rubber, and is intended to be cemented or otherwise secured around and cover the bearing-surface of an ordinary pneumatic or cushioned tire. I may as well employ my invention, however, directly in the fabric of a single-tube tire, as shown in Fig. 6.

When headed metallic rivets are used as the hard road-engaging parts, as illustrated in Figs. 2 and 3, I weave the rivets, preferably in the process of weaving the fabric B, between the warp-threads E and the weft-threads F, so that the heads D of the rivets will be held by the threads against movement perpendicularly to the fabric and that the shanks of the rivets will be held by the threads against lateral displacement in the fabric, while the ends D' of the rivets will be exposed on the outside of the fabric and serve as the hard road-engaging parts, as shown. In like manner and to a like end I weave the staples G in the meshes of the fabric, as shown in Figs. 4 and 5.

In both forms of my invention illustrated the heads of the rivets or staples are held between the two plies of the fabric. I may, however, also weave the road-engaging bearings or parts in the meshes of a single-ply fabric by using rivets or parts headed on both ends, the heads bearing against opposite sides of the fabric, or I may use rivets or parts headed only on the inside of the fabric, relying on the tire itself or a backing cemented to the tread over said heads to hold the parts in place perpendicularly. In any case I prefer to cover the outside of the fabric thus equipped with the rubber layer C, through which the ends D' are exposed by preference level with the surface of the rubber, as shown. In the drawings I have shown the ends D' of the parts clenched on the surface of the rubber to better retain them in place; but such clenching is not necessary and may be dispensed with without departing from the scope of my invention.

The two-ply rubber-covered fabric shown thus equipped with the hard road-engaging parts is peculiarly adapted for making a single-tube tire, the inner surface of the fabric being likewise covered with rubber to make it air-tight, as the heads D of the parts are then held away from the inner rubber covering by the interposed inner ply of the fabric.

It is evident that my invention is applicable to any form of woven-fabric tire or tread and that it may be made mechanically and very cheaply by a suitable addition to any of the existing weaving machinery. Such an improvement I have devised, and it will be made the subject of a separate application for patent intended to be filed hereafter.

In Fig. 6 I have shown my invention embodied in the diagonally-woven fabric of a single-tube tire by means of rivets headed on both ends. This diagonally-woven fabric is generally used for pneumatic tires owing to its greater elasticity.

I claim as my invention—

A tread for a vehicle-tire formed of woven fabric studded with headed hard rivets or parts woven in the fabric, having their heads retained by the meshes of the fabric and their ends exposed on the outer surface of the tread.

In testimony whereof I have hereunto set my hand the 20th day of January, 1897.

CALVIN THAYER ADAMS.

In presence of—
CLARENCE L. BURGER,
HERMAN MEYER.